(12) United States Patent
Bonhomme et al.

(10) Patent No.: US 9,413,035 B2
(45) Date of Patent: Aug. 9, 2016

(54) ELECTROCHEMICAL CELL HAVING INTERRUPTED ELECTRODES

(75) Inventors: Frederic C. Bonhomme, Thiensville, WI (US); Jason D. Fuhr, Sussex, WI (US); Gary P. Houchin-Miller, Milwaukee, WI (US); John P. Dinkelman, South Milwaukee, WI (US)

(73) Assignee: Johnson Controls Technology LLC, Wilmington, DE (US)

( * ) Notice: Subject to any disclaimer, the term of this patent is extended or adjusted under 35 U.S.C. 154(b) by 941 days.

(21) Appl. No.: 13/527,786

(22) Filed: Jun. 20, 2012

(65) Prior Publication Data

US 2012/0328922 A1 Dec. 27, 2012

Related U.S. Application Data

(60) Provisional application No. 61/501,102, filed on Jun. 24, 2011.

(51) Int. Cl.
*H01M 4/00* (2006.01)
*H01M 4/04* (2006.01)
*H01M 10/0587* (2010.01)
*H01M 2/26* (2006.01)
*H01M 10/0525* (2010.01)
(Continued)

(52) U.S. Cl.
CPC .......... *H01M 10/0587* (2013.01); *H01M 2/204* (2013.01); *H01M 2/26* (2013.01); *H01M 4/02* (2013.01); *H01M 10/02* (2013.01); *H01M 10/0525* (2013.01); *H01M 10/4235* (2013.01); *H01M 2/16* (2013.01); *H01M 2/30* (2013.01); *H01M 4/525* (2013.01); *H01M 4/587* (2013.01); *H01M 4/622* (2013.01); *H01M 10/052* (2013.01); *H01M 2220/20* (2013.01); *Y02E 60/122* (2013.01); *Y02P 70/54* (2015.11); *Y02T 10/7011* (2013.01); *Y10T 29/49112* (2015.01)

(58) Field of Classification Search
CPC ... H01M 4/02; H01M 10/0587; H01M 4/622; H01M 10/4235
USPC .......................................................... 429/94
See application file for complete search history.

(56) References Cited

U.S. PATENT DOCUMENTS 8,067,112 B2  11/2011  Roh
2004/0009403 A1  1/2004  Kim et al.
(Continued)

FOREIGN PATENT DOCUMENTS

EP  2337117 A1  6/2011

OTHER PUBLICATIONS

International Search Report and Written Opinion for PCT No. PCT/US2012/043614 dated Oct. 30, 2012; 11 pgs.
(Continued)

*Primary Examiner* — Sarah A Slifka
*Assistant Examiner* — Brent Thomas
(74) *Attorney, Agent, or Firm* — Fletcher Yoder, P.C.

(57) ABSTRACT

Provided herein are electrochemical cell element systems. One such system includes a first electrode having a desired length and an interrupted second electrode having one or more interruptions disposed between a plurality of electrode segments. The system also includes one or more separators positioned to separate the first electrode and the interrupted second electrode. The first electrode, the interrupted second electrode, and the one or more separators are wound along the length of the cell element.

20 Claims, 7 Drawing Sheets

(51) Int. Cl.
*H01M 10/42* (2006.01)
*H01M 2/20* (2006.01)
*H01M 4/02* (2006.01)
*H01M 10/02* (2006.01)
*H01M 2/16* (2006.01)
*H01M 2/30* (2006.01)
*H01M 4/525* (2010.01)
*H01M 4/587* (2010.01)
*H01M 4/62* (2006.01)
*H01M 10/052* (2010.01)

(56) References Cited

U.S. PATENT DOCUMENTS

2006/0222933 A1* 10/2006 Fujikawa ............ H01M 2/1673
                                                                429/130
2007/0072082 A1*  3/2007 Scott et al. ................ 429/231.95
2011/0070492 A1   3/2011 Yamamoto et al.
2011/0151295 A1*  6/2011 Kim ................................ 429/94

OTHER PUBLICATIONS

CN Office Action dated Jul. 2, 2015.

* cited by examiner

ELECTROCHEMICAL CELL HAVING INTERRUPTED ELECTRODES

CROSS REFERENCE TO RELATED APPLICATIONS

This application claims priority from and the benefit of U.S. Provisional Application Ser. No. 61/501,102, entitled, "Cell With Interrupted Electrode," filed Jun. 24, 2011, which is hereby incorporated by reference.

FIELD OF THE DISCLOSURE

The present application relates generally to the field of batteries and battery systems and, more specifically, to electrochemical cells that have at least one interrupted electrode.

BACKGROUND

Vehicles using electric power for all or a portion of their motive power may provide a number of advantages as compared to more traditional gas-powered vehicles using internal combustion engines. For example, vehicles using electric power may produce fewer undesirable emission products and may exhibit greater fuel efficiency as compared to vehicles using internal combustion engines (and, in some cases, such vehicles may eliminate the use of gasoline entirely, such as in certain types of plug-in hybrid electric vehicles). As technology continues to evolve, there is a need to provide improved power sources, such as battery systems or modules, for such vehicles. For example, it is desirable to increase the distance that such vehicles may travel without the need to recharge the batteries. It is also desirable to improve the performance of such batteries and to reduce the cost associated with the battery systems.

The use of newer battery chemistries and the desire to enhance performance of electric vehicles have given rise to new design and engineering challenges. For example, it may be desirable for such battery systems to exhibit improved thermal characteristics under short circuit conditions. One test that probes the thermal characteristics of a battery system under a short circuit condition is the blunt nail penetration test. During this test, the battery system is typically punctured with a nail, and the maximum temperature reached by the system is measured. While some current battery systems have been developed that seek to reduce the maximum temperature that is measured during such tests, many current battery systems, when probed in this manner, exhibit sparking or flaming behavior due in part to the occurrence of local hot spots that arise from the short circuit condition. Accordingly, it would be desirable to provide an improved battery system for use, for example, in vehicles using electric power, that is capable of exhibiting improved thermal characteristics during short circuit conditions.

SUMMARY

In one embodiment, an electrochemical cell element system includes a first electrode having a desired length and an interrupted second electrode having one or more interruptions disposed between a plurality of electrode segments. The system also includes one or more separators positioned to separate the first electrode and the interrupted second electrode. The first electrode, the interrupted second electrode, and the one or more separators are wound along the length of the cell element.

In another embodiment, a battery system includes an electrochemical cell element including an anode having a desired anode length and a cathode having a desired cathode length. The cell element also includes one or more separators positioned to separate the anode and the cathode. The anode, the cathode, and the one or more separators are wound along the length of the electrochemical cell element, and at least one of the anode and the cathode is interrupted along the given length.

In another embodiment, a method of manufacturing an electrochemical cell element is provided. The method includes winding a first electrode portion around a mandrel for one rotation. The first electrode portion is a first portion of an interrupted electrode. The method also includes winding a continuous second electrode and one or more separators around the mandrel for at least one rotation in addition to the rotation of the first electrode portion. The method further includes winding a second electrode portion around the mandrel for one rotation. The second electrode portion comprises a second portion of the interrupted electrode. The method also includes winding the continuous second electrode and the one or more separators around the mandrel for at least one rotation in addition to the rotation of the second electrode portion.

DRAWINGS

DETAILED DESCRIPTION

As described in more detail below, disclosed herein are embodiments of battery systems including electrochemical cells with interrupted electrodes. That is, embodiments of the electrochemical cells provided herein may include a substantially continuous anode in combination with an interrupted cathode, a substantially continuous cathode in combination with an interrupted anode, or any other desired configuration, such that the electrochemical cell includes an interrupted electrode. For example, in one embodiment, an electrochemical cell may have a wound cell element that includes a positive electrode, a negative electrode, and separators, and the positive electrode may have interruptions disposed between segments of electrode material.

The foregoing battery systems that include the electrochemical cells having interrupted electrodes may be configured for use in vehicles in which the battery system provides at least a portion of the propulsion power for the vehicle. It should be noted that in certain embodiments, the battery system may include one battery module or a plurality of battery modules and that each battery module may include one electrochemical cell or a plurality of electrochemical cells configured to store an electrical charge. In certain embodiments, the electrochemical cells may have one or more interrupted electrodes. The foregoing feature may offer advantages over traditional systems. For example, in instances in which the electrochemical cell having the interrupted electrode is punctured, only a single segment of the interrupted electrode may be punctured, thus reducing or eliminating the likelihood that the short circuit caused by the puncture will propagate.

Figure 1:
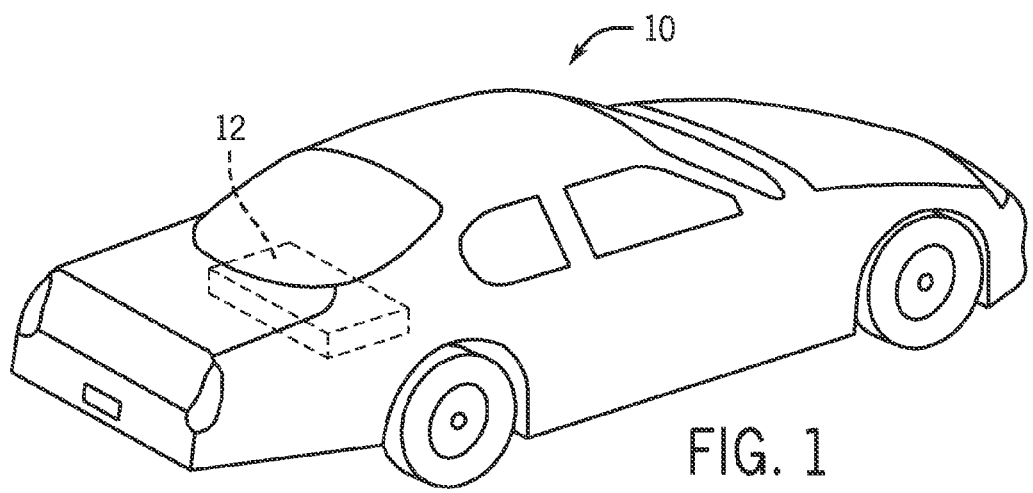
FIG. 1 is a perspective view of an embodiment of a vehicle having a battery system for providing all or a portion of the motive power for the vehicle.

Turning now to the drawings, FIG. 1 is a perspective view of a vehicle 10 in the form of an automobile (e.g., a car) having a battery system 12 for providing all or a portion of the motive power for the vehicle 10. For the purposes of the present disclosure, it should be noted that the battery modules and systems illustrated and described herein are particularly directed to applications in providing and/or storing energy in xEV electric vehicles, as described in more detail below. However, embodiments of the electrochemical cells having interrupted electrodes may be utilized in other, non-vehicular applications as well.

As will be appreciated by those skilled in the art, hybrid electric vehicles (HEVs) combine an internal combustion engine propulsion and high voltage battery power to create traction, and includes mild hybrid, medium hybrid, and full hybrid designs. A plug-in electric vehicle (PEV) is any vehicle that can be charged from an external source of electricity, such as wall sockets, and the energy stored in the rechargeable battery packs drives or contributes to drive the wheels. PEVs are a subcategory of vehicles using electric power for propulsion that include all-electric (EV) or battery electric vehicles (BEVs), plug-in hybrid vehicles (PHEVs), and electric vehicle conversions of hybrid electric vehicles and conventional internal combustion engine vehicles. The term "xEV" is defined herein to include all of the foregoing or any variations or combinations thereof that include electric power as a motive force.

Additionally, although illustrated as a car in FIG. 1, the type of the vehicle 10 may be implementation-specific, and, accordingly, may differ in other embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

Further, although the battery system 12 is illustrated in FIG. 1 as being positioned in the trunk or rear of the vehicle 10, according to other exemplary embodiments, the location of the battery system 12 may differ. For example, the position of the battery system 12 may be selected based on the available space within the vehicle 10, the desired weight balance of the vehicle 10, the location of other components used with the battery system (e.g., battery management systems, vents or cooling devices, etc.), and a variety of other implementation-specific considerations.

Figure 2:
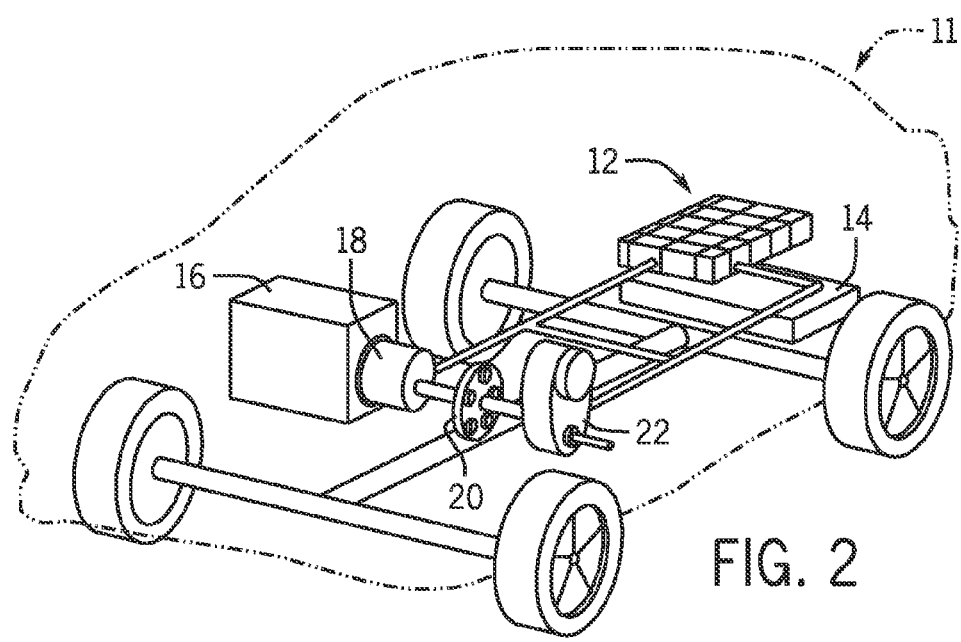
FIG. 2 illustrates a cutaway schematic view of an embodiment of the vehicle of FIG. 1 provided in the form of a hybrid electric vehicle.

FIG. 2 illustrates a cutaway schematic view of the vehicle 10 provided in the form of an HEV according to a presently disclosed embodiment. In the illustrated embodiment, the battery system 12 is provided toward the rear of the vehicle 10 proximate a fuel tank 14. However, in other embodiments, the battery system 12 may be provided immediately adjacent the fuel tank 14 or may be provided in a separate compartment in the rear of the vehicle 10 (e.g., a trunk) or may be provided elsewhere in the vehicle 10. An internal combustion engine 16 is provided for times when the HEV utilizes gasoline power to propel the vehicle 10. An electric motor 18, a power split device 20, and a generator 22 are also provided as part of the vehicle drive system. Such an HEV may be powered or driven by just the battery system 12, by just the engine 16, or by both the battery system 12 and the engine 16.

It should be noted that other types of vehicles and configurations for the vehicle electrical system may be used according to other embodiments, and that the schematic illustration of FIG. 2 should not be considered to limit the scope of the subject matter described in the present application. Indeed, according to various other embodiments, the size, shape, and location of the battery system 12, the type of vehicle 10, the type of vehicle technology (e.g., HEV, PEV, EV BEV, PHEV, xEV, etc.), and the battery chemistry, among other features, may differ from those shown or described.

According to an embodiment, the battery system 12 is responsible for packaging or containing electrochemical cells or batteries, connecting the electrochemical cells to each other and/or to other components of the vehicle electrical system, and regulating the electrochemical cells and other features of the battery system 12. For example, the battery system 12 may include features that are responsible for monitoring and controlling the electrical performance of the system, managing the thermal behavior of the system, containment and/or routing of effluent (e.g., gases that may be vented from a battery cell), and other aspects of the battery system, as described in more detail below.

Figure 3:
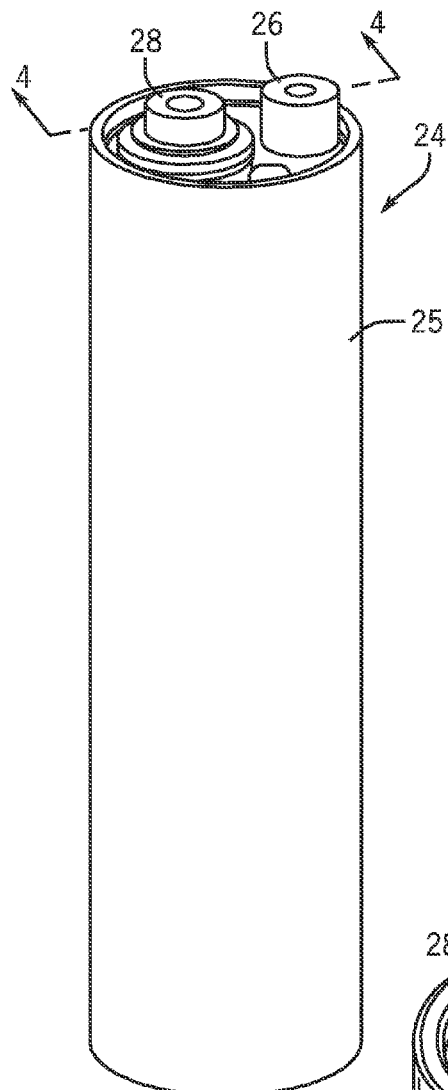
FIG. 3 is a perspective view of an electrochemical cell according to one embodiment.

FIG. 3 is an isometric view of an embodiment of an electrochemical cell 24. The battery system 12 may include a plurality of such electrochemical cells 24 (e.g., lithium-ion cells, nickel-metal-hydride cells, lithium polymer cells, etc., or other types of electrochemical cells now known or hereafter developed). In one embodiment, the electrochemical cells 24 may be generally cylindrical lithium-ion cells configured to store an electrical charge. However, in other embodiments, the cells 24 could have other physical configurations (e.g., oval, prismatic, polygonal, etc.). Further, the capacity, size, design, terminal configuration, and other features of the cells 24 may also differ from those shown according to other embodiments.

Figure 4:
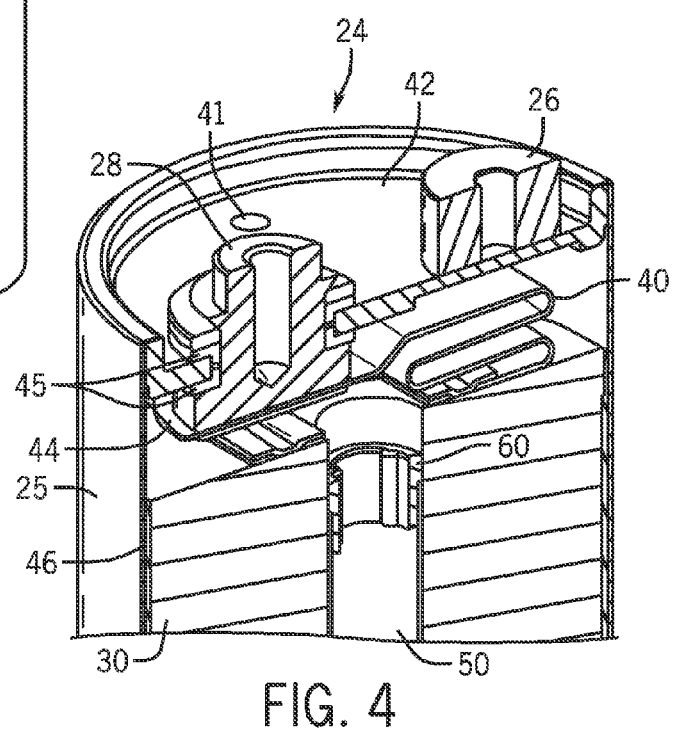
FIG. 4 is a partial cross-sectional view of the electrochemical cell shown in FIG. 3 taken along line 4-4 in FIG. 3.

FIG. 4 is a partial cross-sectional view of the cell 24 shown in FIG. 3 taken along line 4-4 in FIG. 3. In the illustrated embodiment, the cell 24 includes a container or housing 25, a cap or cover 42, a bottom portion (not shown), and a cell element 30. In some embodiments, the housing 25 may be constructed from a conductive material, such as a metal (e.g., aluminum or an aluminum alloy, copper or a copper alloy, etc.). The cell element 30 may be a wound, prismatic, or oval cell element, or any other desired cell element consistent with implementation-specific details.

Figure 5:
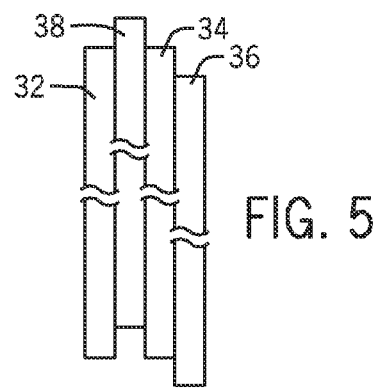
FIG. 5 is a partial cross-sectional view of electrodes and separators for an electrochemical cell according to an embodiment.

Referring to FIG. 5, according to one embodiment, the cell element 30 includes at least one cathode or positive electrode 36, at least one anode or negative electrode 38, and one or more separators 32, 34. The separators 32, 34 are provided intermediate or between the positive and negative electrodes 36, 38 to electrically isolate the electrodes 36, 38 from each other. The separators 32, 34 may be made from a polymeric material (e.g., polefin, polyethylene, polypropylene, etc.), a ceramic material, a combination of polymeric and ceramic material, or any material suitable to electrically isolate the electrodes 36,38.

In some embodiments, the cell element 30 has a wound configuration in which the electrodes 36, 38 and separators 32, 34 are wound around a member or element provided in the form of a tube or mandrel 50. Such a configuration may be referred to alternatively as a jelly roll configuration. Although the mandrel 50 is shown as being provided as having a generally cylindrical shape, according to other embodiments, the mandrel 50 may have a different configuration (e.g., it may have an oval or rectangular cross-sectional shape, etc.). The mandrel 50 may also be configured as a generally hollow tube to allow transfer of gas inside the cell. Further, the mandrel 50 may be made from different materials, such as aluminum or other metallic materials, or a polymeric material. It is noted that the cell element 30, although shown as having a generally cylindrical shape, may also have a different configuration (e.g., it may have an oval, prismatic, rectangular, or other desired cross-sectional shape), depending on implementation-specific considerations.

In one embodiment, the positive electrode 36 is offset from the negative electrode 38 in the axial direction as shown in the partial cross-sectional view of FIG. 5. Accordingly, at a first end of the cell element 30, the wound positive electrode 36 extends further than the negative electrode 38, and at a second (opposite) end of the cell element 30, the negative electrode 38 extends further than the positive electrode 36.

It should be noted that the electrodes may be made from a variety of suitable materials. In one embodiment, the positive electrode 36 includes a NMC (lithium nickel manganese cobalt oxide) active layer disposed on an aluminum layer. In another embodiment, the positive electrode 36 includes a NCA (lithium nickel cobalt aluminum oxide) active layer. In still other embodiments, the negative electrode 38 includes an active layer of carbon material, such as graphite, disposed on a copper layer or nickel layer. The electrode layers may, for example, be between approximately 50 and 200 microns thick. Other chemistries are contemplated, however, including other Li-ion and NiMH chemistries, or any other suitable battery chemistry.

One advantageous feature of such a configuration is that current collectors may be connected to a specific electrode at one end of the cell 24 without contacting the opposite polarity electrode. For example, according to one embodiment, a negative current collector 40 (e.g., as shown in FIG. 4) may be connected to the exposed negative electrode 38 at one end of the cell element 30, and a positive current collector (not shown) may be connected to the exposed positive electrode 36 at the opposite end of the cell element 30.

According to one embodiment, the cell 24 includes an electrolyte (not shown), and the electrolyte may be provided in the housing 25 of the cell 24 through a fill hole 41. After completion of filling the cell 24 with electrolyte, a fill plug may be provided in the fill hole 41 to seal the electrolyte inside the cell 24. The electrolyte may be a lithium salt; however, other chemistries are contemplated, such as a nickel salt.

The cell 24 also includes a negative current collector 40 and a positive current collector (not shown). The negative current collector 40 and the positive current collector are conductive members that are used to couple the electrodes 36, 38 of the cell element 30 to the terminals 26, 28 of the cell 24. For example, the negative current collector 40 couples the negative electrode 38 to the negative terminal 28 (via a tab 44) and the positive current collector couples the positive electrode 36 to the positive terminal 26 of the cell 24 (e.g., via the housing 25). According to the embodiment shown in FIG. 4, the tab 44 of the negative current collector 40 has been at least partially folded or bent back over itself at least one time before being coupled to the negative terminal 28, although other configurations suitable for coupling the electrodes and terminals are contemplated and within the scope of the present disclosure. Because the electrodes 36, 38 are wound, multiple edges (not shown) extend from the electrodes and are bent or crushed by the current collector. According to another embodiment, the current collectors are coupled to the electrodes with a welding operation (e.g., a laser welding operation). According to various embodiments, the current collectors may be formed from a relatively thin sheet of conductive material (e.g., by a stamping operation, a laser cutting operation, etc.) or may be formed by an extrusion process. According to various embodiments, the current collectors may be substantially rigid or may include a flexible or pliable portion.

In the illustrated embodiment, the negative current collector 40 electrically connects the negative electrode 38 to the negative terminal 28 of the cell 24. The negative terminal 28 is insulated from the cover 42 of the housing 25 by an insulator 45, as shown in FIG. 4. The positive current collector (not shown) electrically connects the positive electrode 36 to a bottom of the housing 25. The housing 25 is electrically connected to the cover 42 (e.g., as shown in FIG. 4), which in turn is electrically connected to the positive terminal 26.

Figure 6:
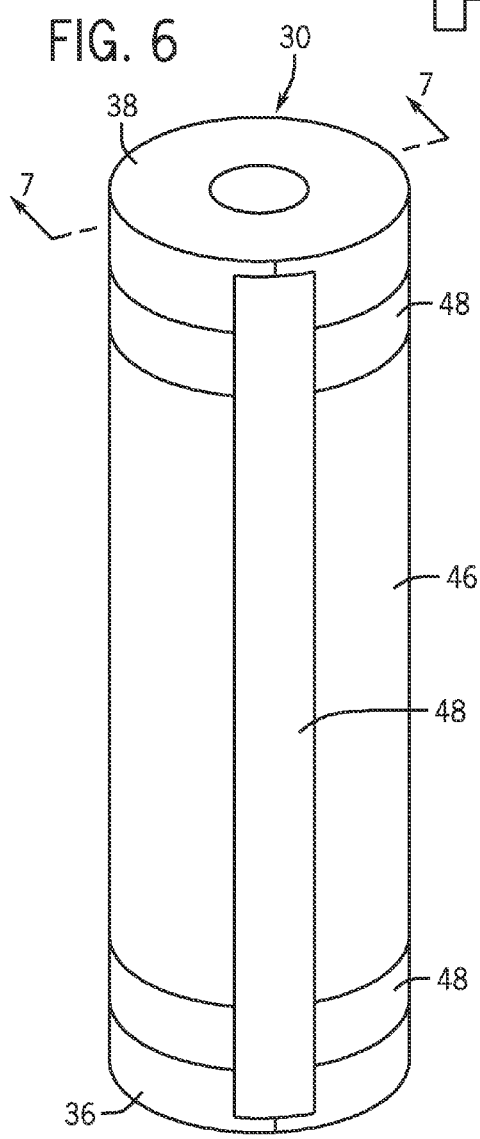
FIG. 6 is a perspective view of a cell element provided in the form of a jelly roll configuration according to an embodiment.
Figure 7:
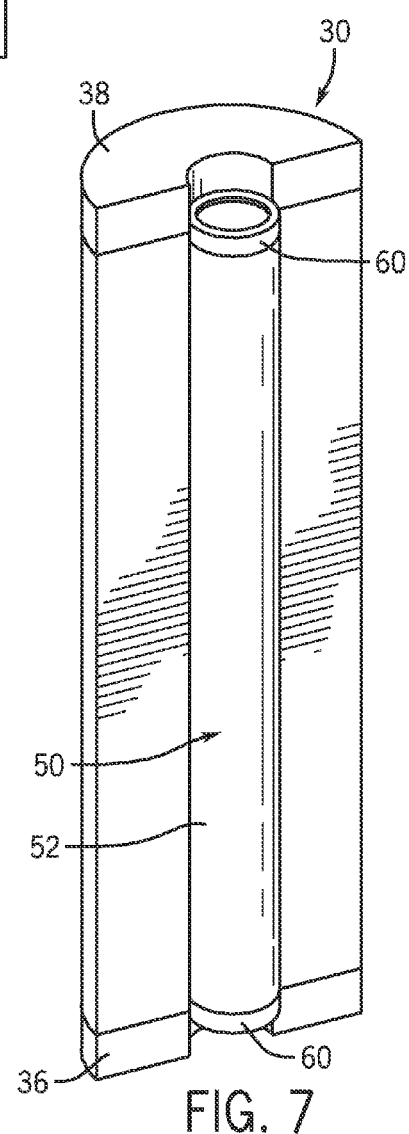
FIG. 7 is a cross-sectional view of the cell element shown in FIG. 6 taken along line 7-7 in FIG. 6.

FIGS. 6-7 illustrate an embodiment of a wound cell element 30 (e.g., a jelly roll) in which electrodes 36, 38 and separators 32, 34 (not shown) are wound around a member or element provided in the form of a mandrel 50 (e.g., a body, center member, shaft, rod, tube etc.). According to an embodiment, an adhesive or tape 48 (e.g., as shown in FIG. 6) may be used to position an electrically-insulating wrap or film 46 (e.g., as shown in FIGS. 4 and 6) around the cell element 30 in order to at least partially electrically insulate the cell element 30 from the housing 25. According to an embodiment, the film 46 is a polymide material such as is commercially available under the trade name Kapton® from E.I. du Pont de Nemours and Company.

In one embodiment, the cell 24 may be further provided with a vent. The vent may be configured to allow gases and/or effluent to exit the cell 24 once the pressure inside the cell 24 reaches a predetermined amount (e.g., during a rise in cell temperature). When the vent deploys (e.g., activates, opens, separates, etc.), the gases and/or effluent inside the cell 24 exit the cell 24 in order to lower the pressure inside the cell 24. According to an embodiment, the vent may act as a safety device for the cell 24 during a high pressure occurrence.

In one embodiment, the vent may be located in the bottom or bottom portion of the housing 25. However, in other embodiments, the vent may be located elsewhere (e.g., such as in the lid or cover of the cell). For example, in one embodiment, the vent may be located in a cover or bottom that is a separate component from the housing 25 that in turn is coupled to the housing 25 (e.g., by a welding operation).

Figure 8:
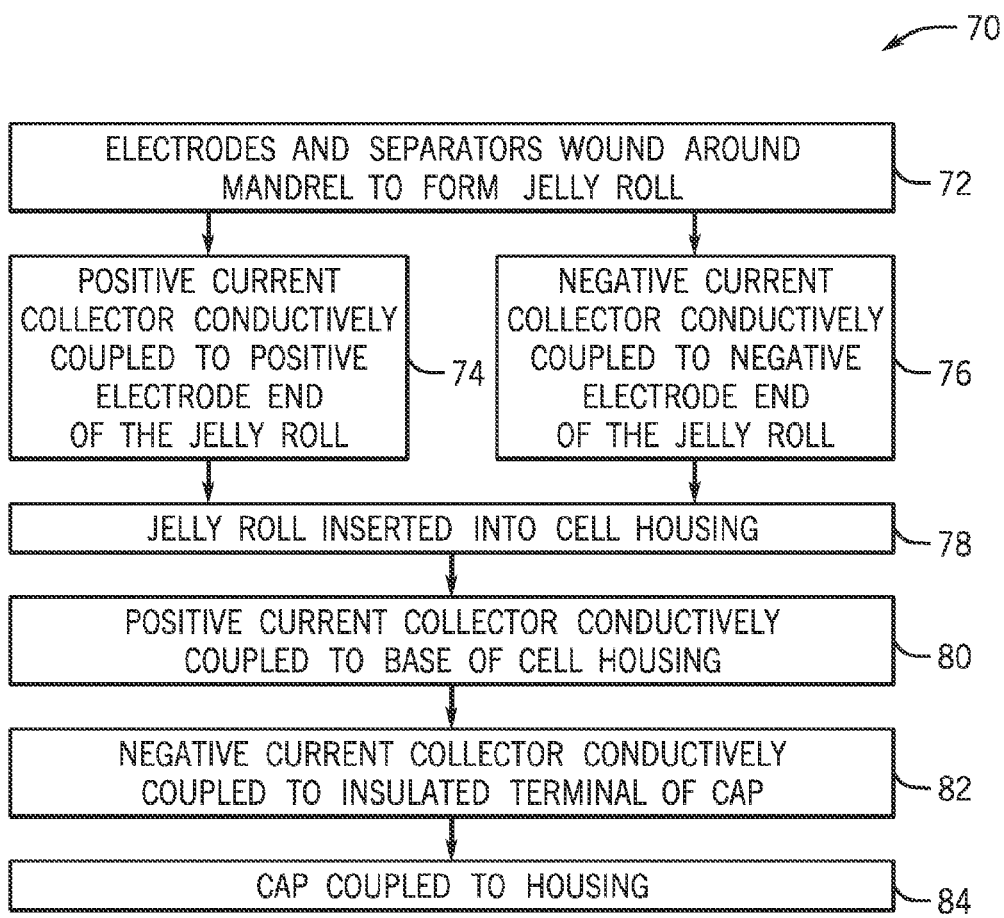
FIG. 8 is a flow diagram of a method of manufacturing an electrochemical cell according to an embodiment.

Referring now to FIG. 8, an assembly process 70 used to make a battery or electrochemical cell is shown according to an embodiment. In a first step 72, the separators and electrodes are wound around the mandrel to form the cell element in a jelly roll configuration, as described above. In a second step 74/76, the positive and negative current collectors are electrically or conductively coupled (e.g., by a welding operation such as laser welding) to the positive and negative electrode ends of the jelly roll, respectively. According to various embodiments, the step 74 may occur before, after, or concurrent with the step 76.

In a third step 78, the jelly roll is inserted into the cell housing. In a fourth step 80, the positive current collector is electrically or conductively coupled (e.g., by a welding operation) to the base of the cell housing. In a fifth step 82, the negative current collector is electrically or conductively coupled (e.g., by a welding operation) to the insulated terminal of the cap of the cell. In a sixth step 84, the cap of the cell is coupled to the housing of the cell (e.g., by a welding operation).

It should be noted that in the following embodiments of the electrochemical cell shown in FIGS. 9-13, the electrochemical cell has an interrupted electrode. That is, embodiments of the electrochemical cells provided herein may include a substantially continuous anode in combination with an interrupted cathode, a substantially continuous cathode in combination with an interrupted anode, or any other desired configuration, such that the electrochemical cell includes an interrupted electrode. For further example, in certain embodiments described in more detail below, the positive electrode may have interruptions disposed between segments of electrode material. The foregoing interruptions provided in one or more of the electrodes may reduce or prevent the likelihood that a short circuit event (e.g., a short circuit arising from a nail puncturing the side of the electrochemical cell) will propagate and affect the entire cell.

Figure 9:
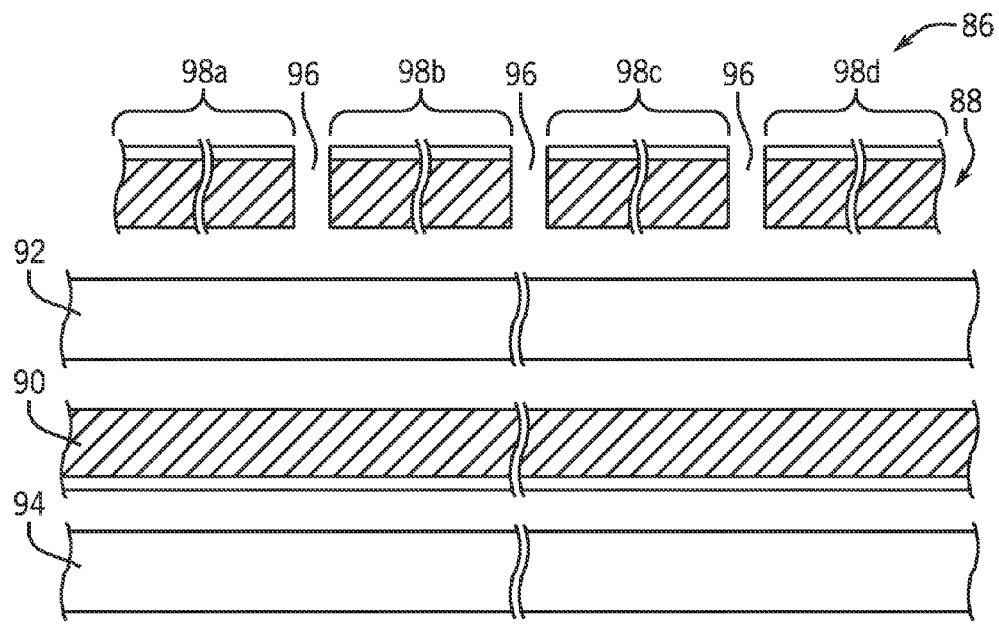
FIG. 9 is an exploded cross-sectional view of an unwound cell element having an interrupted positive electrode according to an embodiment.
Figure 10:
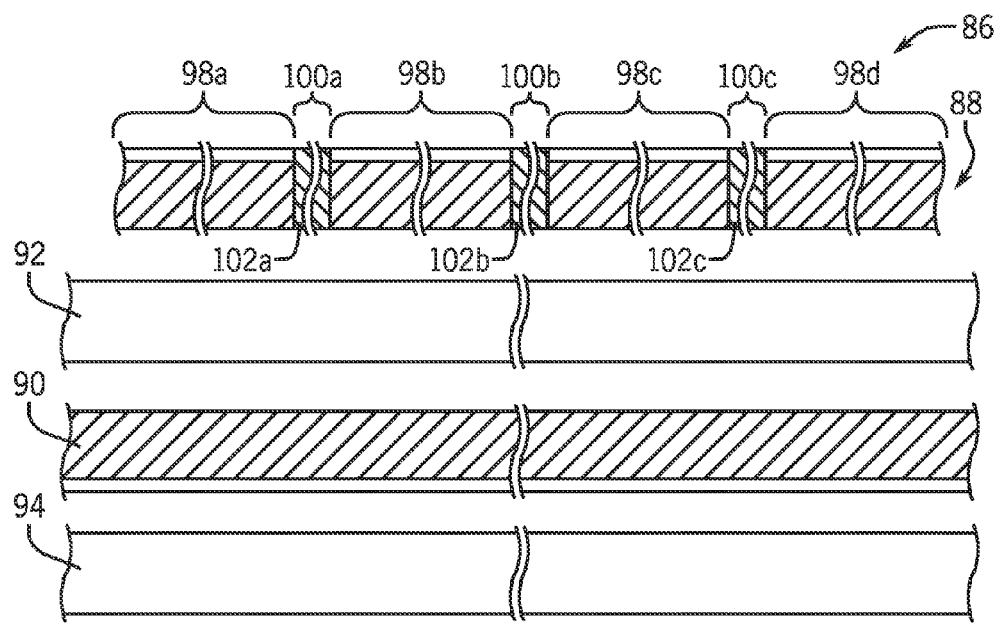
FIG. 10 is an exploded cross-sectional view of an unwound cell element having insulating polymeric material disposed between segments of an interrupted positive electrode.

Now referring to FIG. 9, an exploded cross-section of a cell element 86 of the electrochemical cell is shown according to one embodiment. In this embodiment, the cell element 86 includes an interrupted positive electrode 88, a substantially continuous, uninterrupted, or unbroken negative electrode 90, and separators 92, 94 wound into a generally cylindrical shape. The interrupted positive electrode 88 includes interruptions 96 (e.g., gaps, spaces, voids, etc.) disposed between segments 98a, 98b, 98c, and 98d of the positive electrode 88. The interruptions 96 are generally characterized by a lack of continuity in or an absence of positive electrode material. By providing the interruptions 96, multiple cells connected to one another in parallel may effectively be formed. Further, by interrupting the positive electrode 88, heat propagation resulting from a short circuit condition may be reduced and/or slowed within the cell.

In some embodiments, such as that shown in FIG. 9, the interruptions 96 may include no material such that adjacent separator layers 92 and 94 are disposed proximate each other in the cell element 86. However, in other embodiments, material, such as polymeric materials (e.g., polyolefin, polyimide, and the like) or metal (e.g., aluminum, copper, and the like), may be disposed in the interruptions 96 between segments 98 of the positive electrode 88. For example, referring to the embodiment in FIG. 10, each interruption 100a, 100b, and 100c may include a polymeric material 102a, 102b, and 102c having insulating characteristics that may include high heat resistance and electrical insulating capability. The polymeric material 102a, 102b, and 102c electrically insulates segments 98a, 98b, 98c, and 98d of the positive electrode 88 from each other, such that a short circuit condition in one of the segments 98 is inhibited, or entirely prevented, from spreading to other segments 98 of the positive electrode 88 in the cell element 86. By preventing spread of a short circuit condition between segments 98 and to other parts of the cell element 86, heat propagation is reduced or slowed, such as by preventing formation of a localized hot spot. The polymeric material may also thermally insulate adjacent portions of the cell from each other, preventing heat transfer within the cell.

Figure 11:
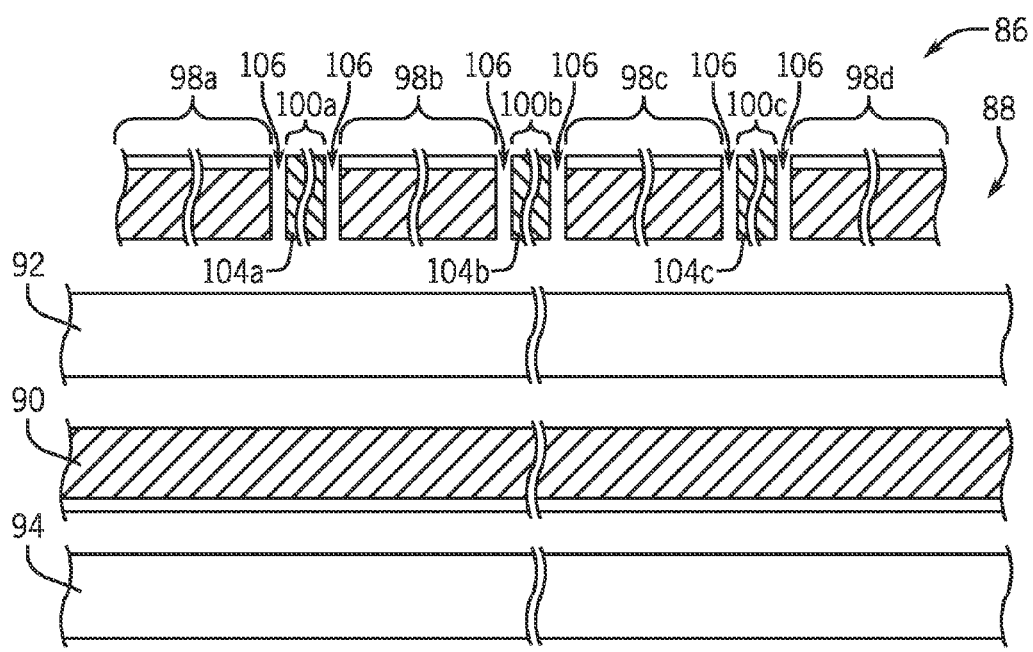
FIG. 11 is an exploded cross-sectional view of an unwound cell element having conductive material disposed between segments of an interrupted positive electrode.
Figure 12:
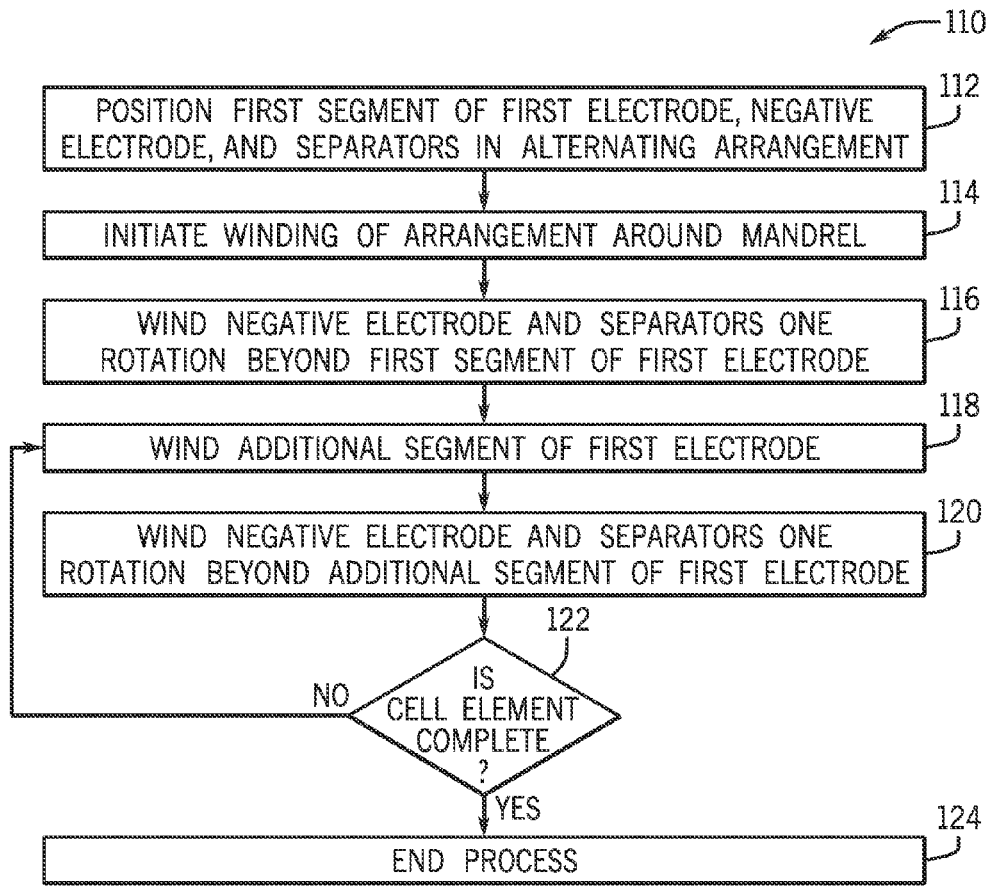
FIG. 12 is a flow diagram of a method of manufacturing an electrochemical cell having an interrupted electrode according to an embodiment.

Still further, in other embodiments, for example, referring to the embodiment in FIG. 11, each interruption 100a, 100b, and 100c may include a material 104a, 104b, and 104c having conductive characteristics. In such embodiments, the interruptions 100a, 100b, and 100c may be separated from the adjacent segments 98 of the positive electrode 88, for example by spaces 106. Further, in these embodiments, the interruptions 100 may include a metallic material having good heat dissipation characteristics. In such embodiments, the metallic material distributes heat within the cell and/or to the housing or otherwise exterior to the cell to reduce localized heat propagation or preventing formation of a localized hot spot.

In certain embodiment, the interruptions 100 are of generally constant width and are oriented generally parallel to the mandrel or central axis of the cell element 86, extending generally the entire or overall height of the positive electrode 88. However, other embodiments are contemplated; for example, the interruptions 100 may have varying or generally increasing widths, a spiral orientation relative to the central axis, or combinations thereof.

In one example embodiment, the cell element 86 includes the positive electrode 88 having four segments 98a, 98b, 98c, and 98d separated by three interruptions 96. In one embodiment, the segments 98a, 98b, 98c, and 98d of the positive electrode 88 are approximately one meter in unwound length. Further, in this embodiment, the interruptions 96 are approximately one rotation of the cell element 86 (i.e., the circumference of the cell element 86 at varying diameters). However, in other embodiments, the positive electrode 88 may include more or fewer segments 98 and more or fewer interruptions 96. The segments 98 may be longer, shorter, or of various lengths. The interruptions 96 may be longer, shorter, of fixed length, or of varying length defined not in relation to the diameter of the cell element 86.

It should be noted that the embodiments of the electrochemical cells having interrupted electrodes provided herein may be formed in a variety of suitable ways. For example, in one embodiment of a method 110 shown in FIG. 12, the cell element 86 may be made using conventional equipment according to conventional processes, appropriately modified to provide for the inclusion of interruptions in the desired electrode material (e.g., in the positive electrode material). A first segment of the first electrode (e.g., positive electrode 88), the second electrode (e.g., negative electrode 90), and the separators (e.g., separators 92 and 94) are arranged in an alternating fashion (block 112) and wound around a mandrel (block 114). When winding of the first electrode portion is complete, winding of the second electrode and separators continues one rotation to create a first interruption (block 116). The process is then repeated with a second and further segments (blocks 118 and 120) until all desired segments of the first electrode are wound into the cell element. A check is performed (block 122) to ensure that the cell element has been completed with the desired quantity of segments, and the process is ended (block 124). It should be noted that in other embodiments, a polymeric or metallic material is wound between segments, for example, of the positive electrode, to form the interruptions.

In other embodiments, methods of assembly for the cell element 86 are contemplated that utilize an interrupted positive electrode 88 that is unitary or a single-piece component. For example, segments 98 of the positive electrode 88 may be coupled together by the polymeric or metallic interruption material to form a continuous sheet having built-in or integral interruptions. In this embodiment, the positive electrode is wound or layered in alternating fashion with the separator layers and the negative electrode. Because the interruptions are integral with the positive electrode, the cell element may be wound without stopping to form interruptions in the positive electrode.

Those skilled in the art will recognize that the interrupted positive electrode and cell may include other configurations or be assembled according to other suitable methods. For example, in some embodiments, the cell may include an interrupted negative electrode in addition to or instead of the interrupted positive electrode. Further, the cell may be a wound prismatic, other wound-type cell, a stacked cell, or any other desired type of cell, depending on implementation-specific considerations.

Figure 13:
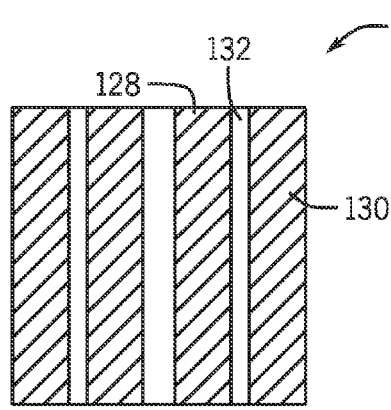
FIG. 13 is a side, cross-sectional view of a cell element having a separator ring disposed between concentric elements according to an embodiment.
Figure 14:
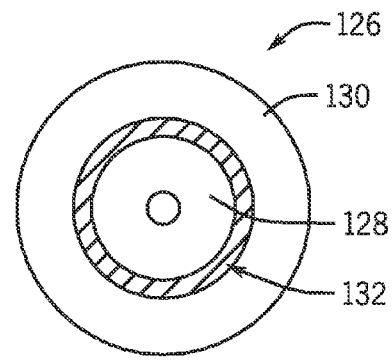
FIG. 14 is a top, cross-sectional view of a cell element having a separator ring disposed between concentric wound elements according to an embodiment.

Referring now to FIG. 13 and FIG. 14, a cell is provided with a cell element 126 that is divided into concentric elements 128 and 130 according to another embodiment. Each concentric element 128, 130 includes a positive and negative electrode and separators arranged in an alternating fashion and wound about a central axis. The interior concentric element 128 is generally separated from the exterior concentric element 130 by a separator ring 132. By separating the interior and exterior concentric elements 128, 130 with the separator ring 132, heat propagation, such as that resulting from a short circuit condition, may be reduced or slowed within the cell.

The separator ring 132 may be made from a polymeric, metallic, ceramic, or other type of material, or a combination thereof. According to one embodiment, the separator ring 132 is a polymeric material, such as polyolefin, polyimide (e.g., Kapton), or poly(phenylene sulfide) (PPS), having good insulating characteristics that may include high heat resistance and/or electrical insulating capability. The polymeric separator ring 132 electrically insulates the concentric elements 128, 130 from each other, thereby inhibiting or preventing transfer of a short circuit condition between the concentric elements 128, 130. The polymeric separator ring 132 may also thermally insulate the concentric elements 128, 130 from each other, thereby inhibiting heat transfer between the concentric elements 128, 130. The polymeric separator ring 132, therefore, reduces heat propagation within the cell.

According to one embodiment, the separator ring 132 is a metallic material, such as aluminum, copper, or titanium, having good heat dissipation characteristics. In the event of a short circuit or other heat generating event, the metallic separator ring 132 distributes heat within the cell. By distributing heat, the separator ring 132 may prevent development of a hot spot and reduce heat propagation throughout the cell.

According to one embodiment, the separator ring 132 is a combination of polymeric and metallic materials, such as those described above. The separator ring 132, for example, may be a metallic ring coated with a polymeric material, or the separator ring 132 may include a metallic ring concentric to a polymeric ring. Having combined characteristics of both polymeric and metallic materials, the polymeric/metallic separator ring 132 may reduce heat propagation within the cell. The polymeric/metallic separator ring 132 has electrical insulating characteristics of the polymeric material and can inhibit or prevent spread of a short circuit condition between concentric elements 128, 130. The polymeric/metallic separator ring 132 also has the heat dissipating characteristics of the metallic material and can distribute heat within the cell. According to other embodiments, the separator ring 132 may additionally include a ceramic or other material, or may include a ceramic or other material instead of the polymeric or metallic materials.

In some embodiment, the cell element 126 may be manufactured according to generally conventional methods. According to one embodiment, electrodes and separators are arranged in an alternating fashion and wound around an interior mandrel to form the interior concentric element 128. Similarly, electrodes and separators are wound around an exterior mandrel (not shown) to form the exterior concentric element 130. The separator ring 132 is disposed within the exterior concentric element 130, and the interior concentric element 128 is disposed within the separator ring 132 to form the cell element 126. The concentric elements 128, 130, mandrels, and separator ring 132 are sized such that an exterior of the interior concentric element 128 is generally proximate an interior surface of the separator ring 132 and that an exterior surface of the separator ring 132 is generally proximate an interior surface of the exterior mandrel. In other embodiments, the exterior mandrel forms the separator ring 132 to separate the interior and exterior concentric elements 128, 130.

According to one embodiment, the separator ring 132 is one or more of the separators. For example, the positive electrode and negative electrode may have adjacent interruptions that are wound one or more rotations. The cell element 126 is manufactured according to one of the methods described above by first winding the positive and negative electrodes and separators about a mandrel to form the interior concentric element 128. Then, the separators are wound alone for one or more rotations to interrupt the positive and negative electrodes and form the separator ring 132. The positive and negative electrodes are reintroduced and wound with the separators to form the exterior concentric element 130. The process may then be repeated until the desired number of concentric cells is reached. In this manner, the separator ring 132 is formed by the separators to separate concentric elements 128, 132.

Those skilled in the art will recognize that the electrochemical cell, cell element, concentric elements, and separator ring may have other configurations, or may be made according to other methods. For example, additional concentric cell elements may be provided, or ring material may be coupled to positive and negative electrode material prior to winding.

Cells comprising interrupted positive electrodes have been tested and shown improved thermal characteristics under short circuit conditions. Batteries of different chemistry were prepared with and without interrupted electrodes and abuse-tested with blunt nail penetration. For batteries with a NMC (i.e., lithium nickel manganese cobalt oxide) cathode and graphite anode, conventional cells reached a maximum temperature of approximately 394 degrees Celsius, whereas interrupted cathode cells reached only about 378 degrees Celsius. For batteries with a NCA (i.e., lithium nickel cobalt aluminum oxide) cathode and graphite anode, conventional cells reached a maximum temperature of approximately 597 degrees Celsius and emitted sparks and heavy flames, whereas interrupted cathode cells reached only about 495 degrees Celsius and emitted no sparks or flames.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of elements of the electrochemical cell as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

The invention claimed is:

1. An electrochemical cell element system, comprising:
   a first electrode having a length;
   an interrupted second electrode comprising an interruption disposed between a first segment of the interrupted second electrode and a second segment of the interrupted second electrode, wherein the interruption comprises a gap between the first segment and the second segment, the interruption comprises polymeric material disposed in the gap, and the polymeric material does not contact the first segment of the interrupted second electrode, the second segment of the interrupted second electrode, or both the first segment of the interrupted second electrode and the second segment of the interrupted second electrode;
   a third electrode;
   a first separator positioned to separate the first electrode and the interrupted second electrode, wherein the first electrode, the interrupted second electrode, and the first separator are wound along the length of the cell element; and
   a second separator, wherein the second separator is disposed between the interrupted second electrode and the third electrode, and wherein the electrically insulative material is separate from the first separator and the second separator.

2. The system of claim 1, wherein the first electrode is substantially continuous along the length.

3. The system of claim 1, wherein the first electrode comprises another interruption disposed between a third segment of the first electrode and a fourth segment of the first electrode.

4. The system of claim 1, wherein the first electrode comprises an anode, and the interrupted second electrode comprises an interrupted cathode.

5. The system of claim 1, comprising a casing that encloses the first electrode, the interrupted second electrode, the third electrode, and the first and second separators.

6. The system of claim 5, comprising a first current collector and a second current collector, wherein the first current collector is coupled to the first electrode and to a first terminal disposed in the casing, wherein the second current collector is coupled to the first segment of the interrupted second electrode, the second segment of the interrupted second electrode, and to a second terminal disposed in the casing, and wherein the first current collector is not in contact with the interrupted second electrode, and the second current collector is not in contact with the first electrode.

7. The system of claim 6, wherein the first current collector is coupled to the first electrode via a laser weld, and the second current collector is coupled to the interrupted second electrode via a laser weld.

8. The system of claim 1, wherein the first electrode, the interrupted second electrode, and the first and second separators are wound around a mandrel to form a jelly roll configuration.

9. The system of claim 1, wherein the interrupted second electrode comprises a lithium nickel manganese cobalt oxide active layer disposed on an aluminum layer.

10. The system of claim 1, wherein the first electrode comprises an active layer of carbon material disposed on a copper layer.

11. A battery system comprising:
    an electrochemical cell element, comprising:
        an anode having an anode length;
        a cathode having a cathode length;
        a separator positioned to separate the anode and the cathode, wherein the anode, the cathode, and the separator are wound along the length of the electrochemical cell element, wherein the anode or the cathode is interrupted by an interruption disposed at a location along the respective anode or cathode length to form a first electrode segment and a second electrode segment, and wherein the interruption comprises a gap between the first electrode segment and the second electrode segment, wherein the interruption comprises polymeric material disposed in the gap and extending an entire first height of the first electrode segment and an entire second height of the second electrode segment, and the polymeric material does not contact the first electrode segment, the second electrode segment, or both the first electrode segment and the second electrode segment; and a first current collector coupled to the first electrode segment, to the second electrode segment, and to a first terminal disposed in a casing of the cell element.

12. The system of claim 11, wherein the electrochemical cell element is part of an electrochemical cell suitable for use in an xEV electric vehicle battery system.

13. The system of claim 11, wherein the cathode comprises a lithium nickel manganese cobalt oxide active layer disposed on an aluminum layer.

14. The system of claim 11, wherein the cathode is interrupted by the interruption and another interruption between the second electrode segment and a third electrode segment.

15. The system of claim 11, wherein the cathode is interrupted by the interruption along the cathode length, wherein a second current collector is coupled to the anode and to a second terminal disposed in the casing, and wherein the first current collector is not in contact with the anode, and the second current collector is not in contact with the cathode.

16. The system of claim 11, wherein the separator comprises a polymeric material, a metallic material, a ceramic material, or a combination thereof.

17. The system of claim 11, wherein the separator comprises polyolefin, polyimide, poly-phenylene sulfide, or a combination thereof.

18. A method of manufacturing an electrochemical cell element, comprising:
    winding a first electrode portion of an interrupted electrode around a mandrel for one rotation;
    winding a continuous electrode and a separator around the mandrel for at least one rotation in addition to the rotation of the first electrode portion of the interrupted electrode;
    winding a second electrode portion of the interrupted electrode around the mandrel for one rotation, wherein an interruption is disposed between the first electrode portion and the second electrode portion of the interrupted electrode, wherein the interruption comprises a gap between the first electrode portion of the interrupted electrode and the second electrode portion of the interrupted electrode, wherein the interruption comprises polymeric material disposed in the gap and extending an entire height of the interrupted electrode, and wherein the polymeric material does not contact the first electrode portion of the interrupted electrode, the second portion of the interrupted electrode, or both the first electrode portion of the interrupted electrode and the second electrode portion of the interrupted electrode; and
    winding the continuous electrode and the separator around the mandrel for at least one rotation in addition to the rotation of the second electrode portion.

19. The method of claim 18, wherein the interrupted electrode comprises a cathode, and the continuous electrode comprises an anode.

20. The method of claim 18, comprising terminating the first electrode portion and the second electrode portion of the interrupted electrode to a common current collector coupled to a common electrode terminal.

* * * * *